(12) United States Patent
Freeman

(10) Patent No.: US 7,059,158 B2
(45) Date of Patent: Jun. 13, 2006

(54) LOCKBOX FOR HITCH RECEIVER

(75) Inventor: Tim Freeman, Lynnwood, WA (US)

(73) Assignee: Frank J. Martin Company, Lynnwood, WA (US)

( * ) Notice: Subject to any disclaimer, the term of this patent is extended or adjusted under 35 U.S.C. 154(b) by 171 days.

(21) Appl. No.: 10/800,223

(22) Filed: Mar. 12, 2004

(65) Prior Publication Data

US 2005/0199021 A1 Sep. 15, 2005

(51) Int. Cl.
*E05B 67/36* (2006.01)
(52) U.S. Cl. .............................. 70/34; 70/63; 70/456 R
(58) Field of Classification Search .................... 70/63, 70/456 R, 158–169, 454; 109/45, 59 R
See application file for complete search history.

(56) References Cited

U.S. PATENT DOCUMENTS

| | | | | |
|---|---|---|---|---|
| 1,914,318 | A | * | 6/1933 | Yankovitch ............... 70/456 R |
| 2,690,666 | A | * | 10/1954 | Engel et al. .............. 70/456 R |
| 3,161,037 | A | | 12/1964 | Lagerquist |
| 3,782,761 | A | | 1/1974 | Cardin, Sr. |
| 4,829,796 | A | * | 5/1989 | Kim ............................ 70/168 |
| 5,730,456 | A | | 3/1998 | Bowers |
| 5,758,529 | A | * | 6/1998 | Chhatwal ..................... 70/423 |
| 5,775,139 | A | | 7/1998 | Sellers |
| 6,019,386 | A | * | 2/2000 | Morelock .................... 280/507 |
| 6,082,519 | A | | 7/2000 | Martin et al. |
| 6,244,614 | B1 | | 6/2001 | Bonvillain et al. |
| 6,412,315 | B1 | | 7/2002 | Cheng et al. |
| 6,419,258 | B1 | | 7/2002 | Grote |
| 6,434,982 | B1 | | 8/2002 | Rowland |
| 6,439,008 | B1 | | 8/2002 | Keil |
| 6,463,686 | B1 | | 10/2002 | Eisenbraun |
| 6,511,090 | B1 | | 1/2003 | Quanbeck et al. |
| 6,568,739 | B1 | | 5/2003 | Burch |
| 6,834,879 | B1 | * | 12/2004 | Lorman ...................... 280/506 |
| 6,908,096 | B1 | * | 6/2005 | Lewis et al. ................. 280/507 |
| 6,910,705 | B1 | * | 6/2005 | Harwood et al. ........... 280/507 |
| 2002/0113406 | A1 | | 8/2002 | Quanbeck et al. |
| 2004/0040351 | A1 | * | 3/2004 | Alcott ............................ 70/63 |
| 2004/0207224 | A1 | * | 10/2004 | Miller et al. .................. 296/21 |

OTHER PUBLICATIONS www.rockcrawler.com website, 2001, "Hitchdog" publication, pp. 1-2.*

* cited by examiner

*Primary Examiner*—Suzanne Dino Barrett
(74) *Attorney, Agent, or Firm*—Black Lowe & Graham PLLC

(57) ABSTRACT

A lockbox is adapted for receipt within a main cavity defined by a conventional trailer hitch. Various embodiments of the lockbox include a pivotable opening front wall, and a removable top. The lockbox may have a rectangular, triangular or other polygonal configuration as well as having the configuration of an elongated tube.

10 Claims, 4 Drawing Sheets

LOCKBOX FOR HITCH RECEIVER

BACKGROUND OF THE INVENTION

1. Field of the Invention

The invention relates generally to security boxes for storing small objects. More specifically, the invention relates to methods and apparatus for storing small objects such as keys of a vehicle, such as an automobile.

2. Description of the Related Art

Homeowners and vehicle owners frequently store a spare house or vehicle key adjacent to their home or car. In the home situation, the key may frequently be hidden behind a post or under a rock. It is well known in the prior art with respect to vehicle applications, that a small magnetized case may house an extra vehicle key and be hidden adjacent to a ferromagnetic portion of the vehicle, such as the inside of a bumper. This same magnetized case or box was also traditionally hidden in residential milk chutes, which were also manufactured of ferromagnetic material. With respect to this application, the case or box could hide a spare house key.

For a variety of reasons, use of the small magnetized case has fallen into disfavor. A principal reason has been that the use of such magnetized boxes has become well known and thus is no longer secure. Furthermore, with respect to residential applications, modern homes are no longer provided with such milk chutes. With respect to vehicles, hollow bumpers are no longer manufactured of ferromagnetic materials to which a magnetic case can adhere.

Homeowners have been provided with alternate key hiding means such as artificial rocks, etc. Nevertheless, homeowners have been provided with further alternate means for storing a spare key adjacent to a residence. One conventional example is shown in U.S. Pat. No. 5,737,947 to Ling, which discloses a mother-and-daughter combination lock having a secured interior compartment for storing a house key. The interior concealed key compartment or chamber resides within a metal case having a lockable shackle. The shackle, in a fashion similar to a conventional padlock, may be unlocked and placed around the knob of an entryway door. With the shackle secured, the device cannot be removed from the doorknob, yet entry to the interior chamber is secured by a combination lock. In the device disclosed by Ling, separate combinations for the shackle and concealed key compartment are actuated by the same set of tumbler wheels bearing a conventional lock combination. Nevertheless, a need exists for a modernized security container for use with a vehicle which can safely store a small object, such as a spare vehicle or residential key.

BRIEF SUMMARY OF THE INVENTION

It is therefore an object of the present invention to provide a security storage box, or lockbox, for close association with a vehicle which can store a small item such as a house or vehicle key.

It is a further object of the invention to achieve the above object with a lockbox for a small item such as a vehicle or residential key, which advantageously utilizes and adopts and existing secure structure on the vehicle for security purposes.

The invention achieves these objects and advantages, and other objects and advantages which will become apparent from the description which follows, by providing a lockbox for a trailer hitch receiver. The preferred embodiment of the lockbox comprises a polygonal container having at least three sides and a base defining an interior compartment for holding such items, such as a house key or a vehicle key. Each of the sides and the base are sized and positioned for selective receipt of the container substantially within a main cavity of a conventional trailer hitch receiver. In the preferred embodiment of the invention, two of the three sides define opposed apertures for receiving a pin having an engaged position with respect to corresponding holes in the receiver hitch. When the lock box is received in the trailer hitch, having opposed apertures aligned with the corresponding holes in the receiver hitch, a retaining pin can be inserted therethrough to selectively retain the container within the main cavity. The retaining pin is removed to permit the lockbox to be removed from the cavity.

In one embodiment of the invention, a first side of the at least three sides has a selective open position with respect to the remaining sides to allow access to the interior compartment of the container while the container is received within the trailer hitch. The lock box may also be provided with retaining members which are cooperatively engaged with the openable first side to cooperatively engage and release the retaining pin.

In an alternative embodiment of the invention, the lockbox is in the form of a simple container having a lid, all of which is entirely received within the main cavity of the trailer hitch receiver and wherein the lockbox is secured therein by the retaining pin. In the alternate embodiment, the retaining pin may be a relockable type, whereas in the preferred embodiment a locking mechanism may be provided on the movable first side of the at least three sides. Although the configuration of the container in the preferred embodiment is described as polygonal, a further alternate embodiment of the invention is provided wherein the main body of the lockbox is in the form of a tube, substantially circular in cross-section, having a single continuous sidewall rather than a polygon having a plurality of distinct sidewalls.

BRIEF DESCRIPTION OF THE SEVERAL VIEWS OF THE DRAWING(S)

DETAILED DESCRIPTION OF THE INVENTION

Figure 1:
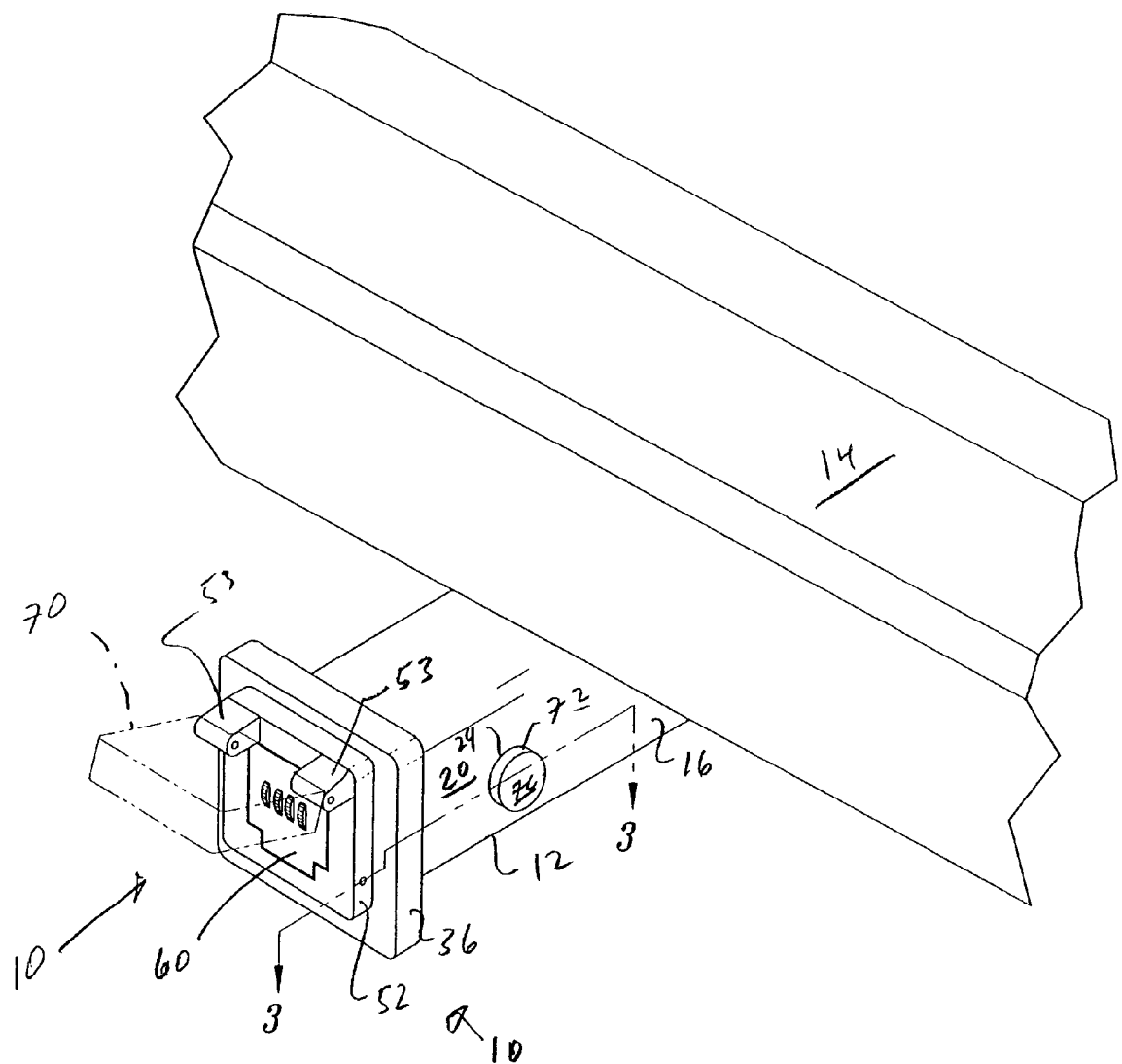
FIG. 1 is a perspective, environmental view of a lockbox for a trailer hitch of the present invention.
Figure 2:
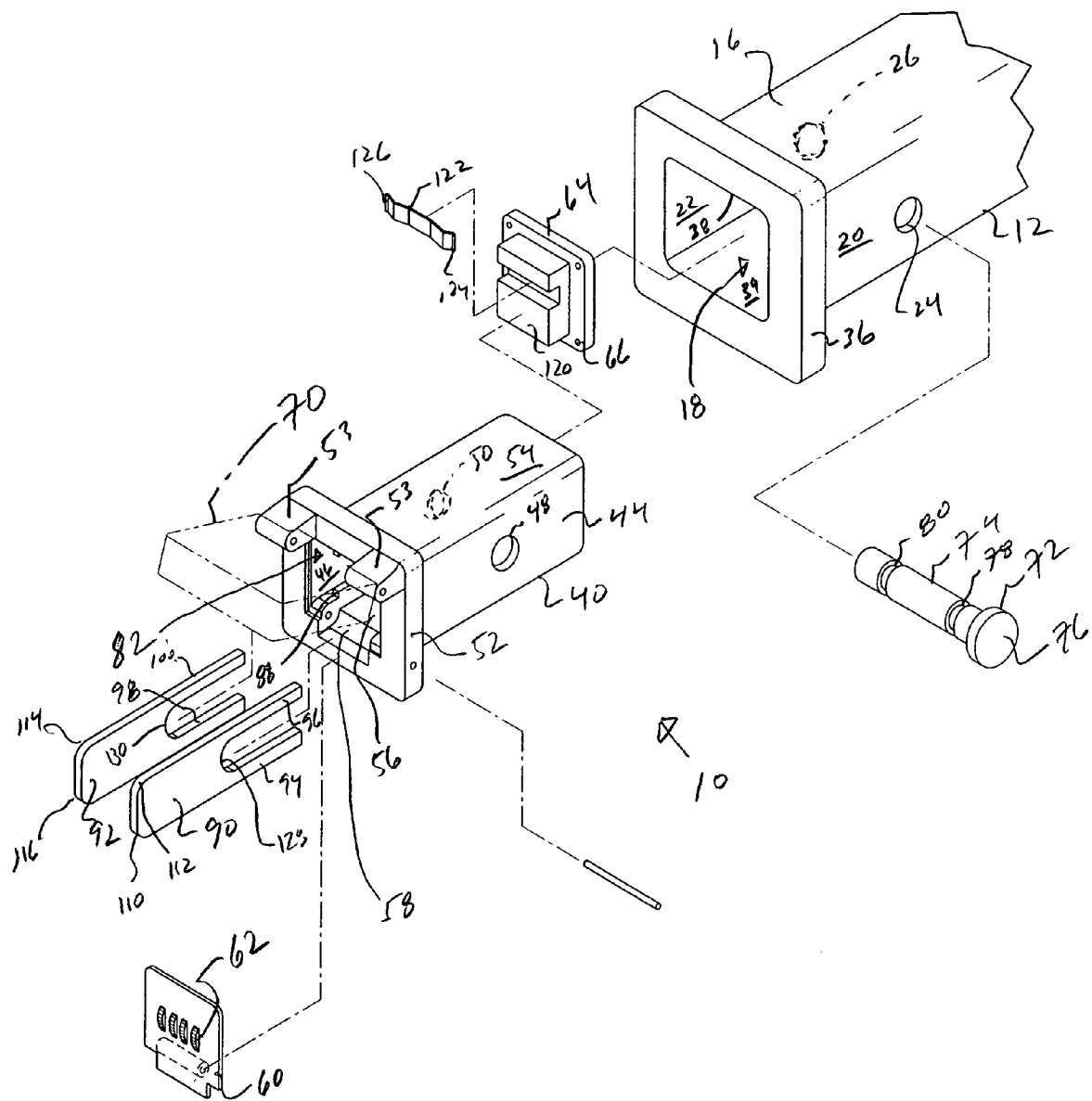
FIG. 2 is an exploded, perspective view of the lockbox of FIG. 1.

A lockbox in accordance with the principles of the invention is generally indicated at reference numeral 10 in the various figures of the attached drawings wherein numbered elements in the figures correspond to like-numbered elements herein. The lock box is sized and adapted for receipt in a vehicle hitch receiver 12 (also conventionally referred to as a: receiver; hitch box; and/or, coupling tube) connected to a vehicle (not shown) typically having a rear bumper 14. As best seen in FIG. 2, the hitch receiver comprises a square tube 16 defining an interior main cavity 18 having a height and width of approximately two inches. Parallel, vertical sidewalls 20, 22 define opposed corresponding holes 24, 26 for a conventional retaining pin 28 (see FIG. 4A) which is adapted to secure a conventional hitch adapter 30. The hitch adapter may or may not include a conventional drop tongue 32 which supports a conventional hitch ball 34 for the towing of a trailer or the like by the vehicle.

Hitch receivers of this type are typically provided with an enlarged, peripheral flange 36 such that the centers of the holes 24, 26 are rearwardly displaced from the front of the peripheral flange 36 by a distance of approximately 2½ inches. In addition, the holes 24, 26 have a standard vertical position which is midway between a top horizontal ceiling 38, and a bottom horizontal floor 39.

Figure 3:
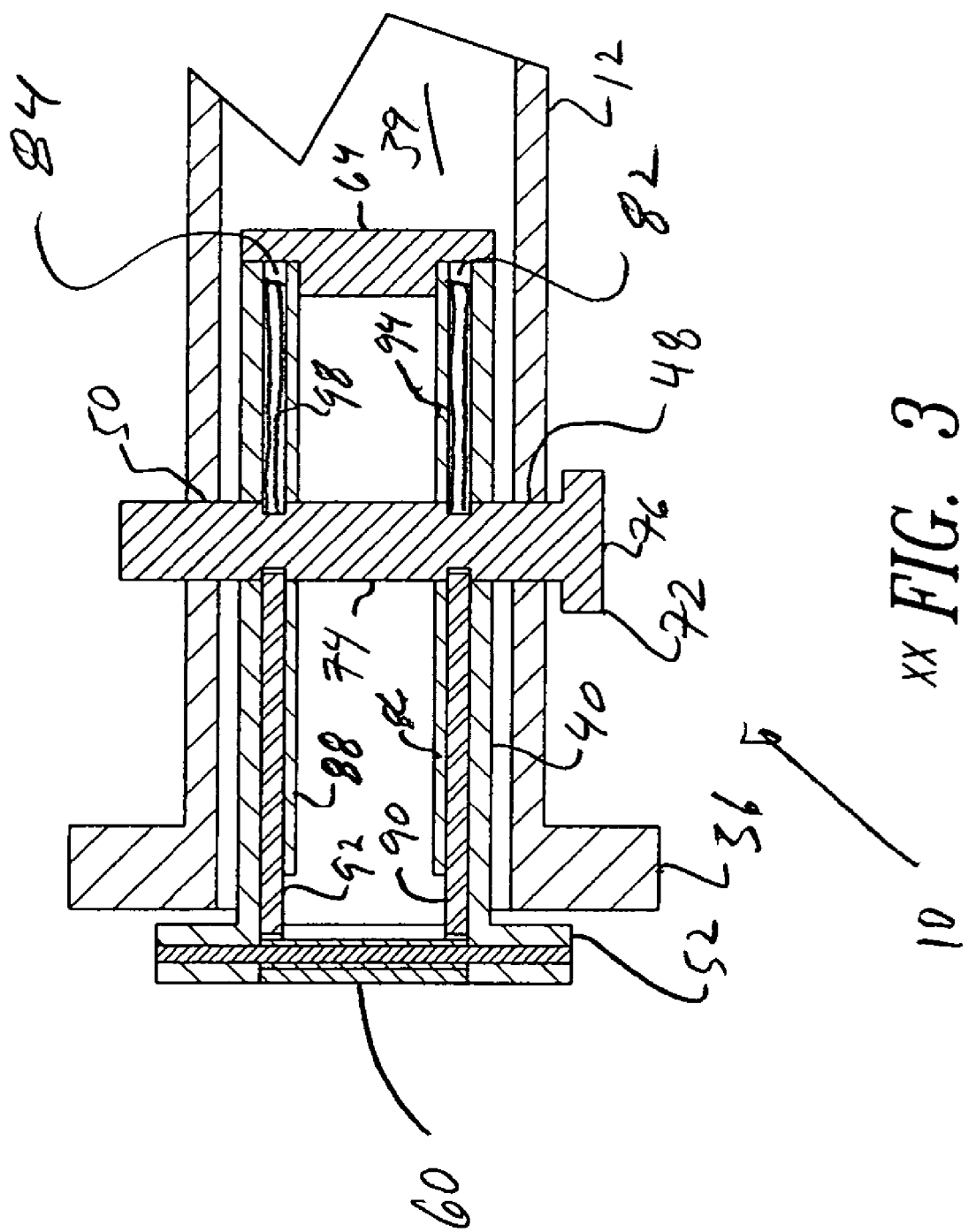
FIG. 3 is a cross-sectional view taken along line 3—3 of FIG. 1.

The hitch receiver 12 (and hitch adapter 30) are conventionally manufactured of hardened steel so as to transmit the forces of acceleration and deceleration from the vehicle to the trailer or other object being towed. The invention advantageously utilizes the inherent strength of the hitch receiver 12 to provide a secured environment for the lockbox 10 which is substantially received within the interior main cavity 18. As best seen in FIGS. 2 and 3, the lockbox 10 has a main body 40 in the shape of an elongated tube. The main body can have any suitable cross-sectional shape (e.g., circular, oval, etc.) but a preferred embodiment is provided with parallel, vertical sidewalls 44, 46, each defining opposed, circular apertures 48, 50. The apertures preferably have a diameter of approximately ⅝ inch, to correspond to the standard diameter of the corresponding holes 24, 26 in the hitch receiver 12.

The main body 40 has, integrally formed therewith, a peripheral flange 52 extending laterally from the vertical sidewalls 44, 46 and vertically from a top wall 54 and a bottom wall 56 of the main body. A bottom portion 58 of the flange 52 supports a pivotable door 60 including a lock mechanism having a wheeled combination lock 62 of a type well known by those of ordinary skill in the lock art. The door 60, therefore provides selective access to an interior cavity defined by the sidewalls 44, 46 and the top and bottom walls 54, 56. The interior cavity is closed by an end cap 64 having holes 66 therein for receipt of screws or the like (not shown) which secure the end cap to the main body 40. The peripheral flange 52 may also have protrusions 53 which support a pivotally connected dust cap 70 shown in phantom lines to prevent the ingress of dirt or other contaminants to the combination lock 62.

In order to secure the lockbox 10 within the main cavity generally indicated at reference numeral 18 of the hitch receiver 12, a modified retaining pin 72 is provided. As with the conventional retaining pin 28, the modified retaining pin 72 has an elongated shaft 74 having a diameter slightly smaller than the holes 24, 26 and corresponding apertures 48, 50. In addition, the modified retaining pin 72 has an enlarged head 76 at one end of the retaining pin in a fashion similar to the conventional retaining pin 28. Nevertheless, the modified retaining pin 72 is provided with circumferential grooves 78, 80 which are alignable with tracks 82, 84 best seen in FIG. 3. The tracks are defined by ridges 86, 88, which in turn are defined by the vertical sidewalls 44, 46 so as to form channels adjacent to the top wall 54 and bottom wall 56 of the main body 40 for slidable receipt of pin retaining members 90, 92. The pin retaining members are in the form of forks having tines 94, 96 and 98, 100 which are spaced apart so as to not engage the circumferential grooves 78, 80 in their modified retaining pin 72 when the modified retaining pin is received in the holes 24, 26 and corresponding apertures 48, 50 of the hitch receiver 12 and the lockbox 10, respectively. That is, the pin retaining members 90, 92 are slidably received in the tracks 82, 84 such that when the pin retaining members are fully positioned with the tracks, the modified retaining pin cannot be removed as will be described further herein below. Hence, the lockbox 10 is firmly and securely retained with the strengthened hitch receiver 12. The pin retaining members 90, 92 are provided with rounded corners 110, 112, 114, 16 at distal ends thereof for engagement with the pivoting door 60. The end cap 64 is also provided with a mounting protuberance 120 for receipt of a leaf spring 122 having end tabs 124, 126 for resilient engagement with distal ends of the tines 96, 100. The length of the tines is appropriately selected such that upon closing the pivotable door 60, a lower portion of the door will engage the rounded corners 110, 116 forcing the pin retaining members 90, 92 rearwardly in the tracks 82, 84 against the urging of the spring end tabs 124, 126. When the pivotable door 60 is fully closed, the spring 122 will be fully compressed and the circumferential grooves 78, 80 fully engaged by termini 128, 130 of the tines of the pin retaining members. Conversely, when the pivotal door 60 is fully opened, the end tabs 124, 126 of the spring 122 will urge the pin retaining members 90 in the opposite direction such that termini 128, 130 of the pin retaining members 90, 92 will disengage the circumferential grooves 78, 80 of the retaining pin 72. Thereupon, the retaining pin may be removed from the hole 24, 26 and corresponding apertures 48, 50 such that the entire lockbox 10 may be removed from the main cavity 18 of the hitch receiver 12.

As will be apparent from the above, when the lockbox 10 is received in the main cavity 18 and retained by the modified retaining pin 72, a vehicle or house key, or other small item may be safely and securely retained with the lockbox. The pivotal door 60 by way of the wheel combination 62 allows selective access to the aforementioned key or keys. In this manner, the driver of a vehicle having a conventional hitch receiver 12 may always have a spare key available in the vehicle, and unauthorized persons will not have access to that key. The invention advantageously incorporates the structural integrity of the hitch receiver 12 itself. Thus, the only portion of the lockbox 10 which is necessarily manufactured from strong material such as steel is the peripheral flange 52 and pivotable door 60.

Figures 4A, 4B:
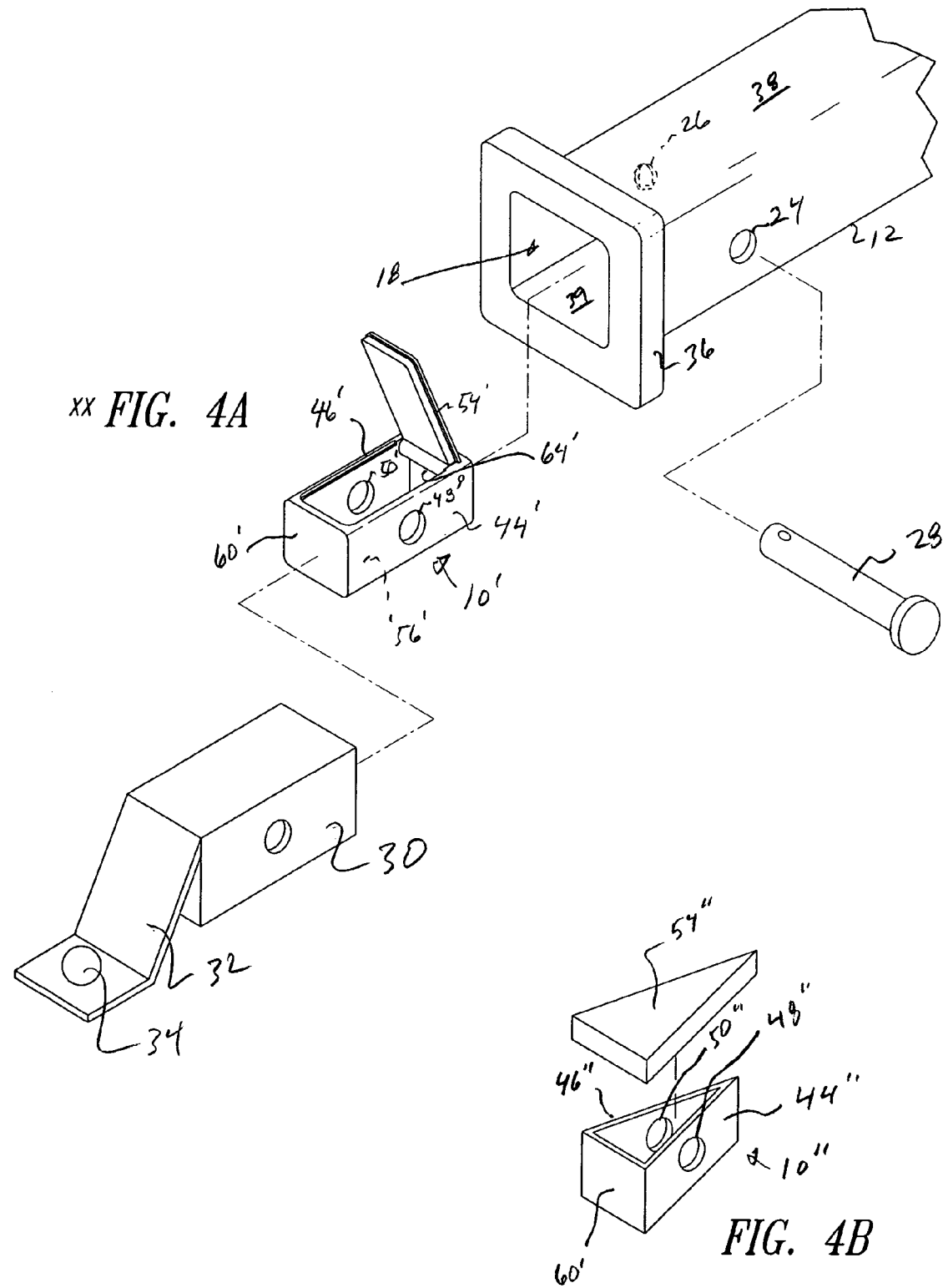
FIG. 4A is an exploded, perspective view of an alternate embodiment of the invention.
FIG. 4B is a second alternate embodiment of the invention shown in FIG. 4A.

FIGS. 4A and 4B illustrate alternative embodiments of the invention which employ the general inventive principles described above, but at lower manufacturing costs. FIG. 4A shows a variation of the invention in which the lockbox 10' has parallel sidewalls 44' and 46' and defining the apertures 48', 50'. However, the top wall 54' is pivotally connected to the sidewalls. The pivotal front door 60 of the preferred embodiment is replaced with a fixed forward wall 60' and the end cap 64 of the preferred embodiment is replaced with a fixed end cap 64'. In this embodiment, lockbox 10' is totally received within the main cavity 18 of the hitch receiver 12. The dimensions of the alternate embodiment lockbox 10' in height and width can be sufficiently reduced such that the lockbox 10' is also received within a cavity defined by the hitch adapter 30 such that the alternate embodiment lockbox 10' is totally sealed and the hitch ball 34 is fully usable for trailering duties. Due to the effective concealment of the lockbox 10', a conventional retaining pin 28 may be used. In the alternative, a retaining pin having its own lock (such as that disclosed in U.S. Pat. No. 6,412,315 B1 to Cheng et al., the disclosure which is incorporated herein by reference) may be used.

Finally, FIG. 4B illustrates that the basic concepts of the invention can be employed in any polygonal shape having opposed sidewalls 44" and 46" with apertures 48" and 50". This second alternate embodiment 10" has a triangular plan and a fully removable lid 54".

Those of ordinary skill in the art will conceive of other alternate embodiments of the invention upon reviewing this disclosure. Thus, the invention is not to be limited to the above description, but is to be determined in its scope by the claims which follow.

The invention claimed is:

1. A lock box for a trailer hitch receiver, comprising:
  a polygonal container having at least three sides and a base defining an interior compartment for holding small items, each of the at least three sides and the base being sized and positioned for selective receipt of the container substantially within a main cavity of a trailer hitch receiver wherein two of the three sides define opposed apertures for receipt of a pin having an engaged position with respect to corresponding holes in the receiver hitch to selectively retain the container within the main cavity of the trailer hitch receiver and a disengaged position to allow release of the container from the main cavity;
  including a first side of the at least three sides of the container having a selective open position to allow access to the interior compartment of the container and a selective closed, lockable position; and
  a lock coupled to the container to deter access to the interior compartment of the container.

2. The lock box of claim 1 wherein the lock is a combination lock.

3. The lock box of claim 1 wherein the lock is coupled to the first side of the container.

4. A lock box for a trailer hitch receiver, comprising:
  an elongated tube sized for selective receipt substantially within a main cavity of a trailer hitch receiver, the tube having an openable front wall, a back wall, and a side wall defining an openable interior compartment for holding small items, wherein the side wall defines opposed first and second apertures, the first and second apertures positioned so as to be each substantially alignable with a corresponding first and second side holes in the trailer hitch receiver when the tube is positioned substantially within the main cavity of the trailer hitch receiver for receipt of a retaining pin; and,
  a lock coupled to the openable front wall to deter access to the interior compartment of the tube.

5. The lock box of claim 4 including a retaining pin having a first position wherein the pin is received in the apertures and the holes to selectively retain the tube when the tube is positioned substantially within the main cavity, and a second position wherein the pin is not received in the apertures and the holes to allow removal of the tube from the main cavity of the trailer hitch receiver.

6. The lock box of claim 5 wherein the side wall includes parallel spaced apart first and second sides, including a first slot in the first side and a second slot in the second side, and further including a first and a second pin retaining member, the first and the second slot each configured to selectively receive the respective first and second pin retaining member.

7. The lock box of claim 6 wherein the retaining pin has first and second circumferential grooves and wherein the first pin retaining member has a distal end configured to selectively engage the first circumferential groove in the retaining pin and the second pin retaining member also has a distal end configured to selectively engage the second circumferential groove in the retaining pin.

8. The lock box of claim 6 wherein the side wall includes parallel top and bottom walls.

9. The lock box of claim 4 wherein the lock is positioned on the front wall of the tube, and a dust flap coupled to the lock has an open position to provide access to the lock and a closed position to cover the lock.

10. The lock box of claim 4 wherein the lock is a keyless lock.

* * * * *